US012561306B2

(12) United States Patent
Yang et al.

(10) Patent No.: US 12,561,306 B2
(45) Date of Patent: Feb. 24, 2026

(54) SYSTEMS AND METHODS FOR OPTIMIZING DATA PROCESSING IN A DISTRIBUTED COMPUTING ENVIRONMENT

(71) Applicant: The Toronto-Dominion Bank, Toronto (CA)

(72) Inventors: Dan Ni Yang, Toronto (CA); Méliné Nikoghossian, Toronto (CA); Elham Hajarian, Toronto (CA); Behjat Soltanifar, Toronto (CA); Karishma Harshal Patel, Bradford (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/838,539

(22) Filed: Jun. 13, 2022

(65) Prior Publication Data

US 2023/0401192 A1 Dec. 14, 2023

(51) Int. Cl.
| | |
|---|---|
| *G06F 16/22* | (2019.01) |
| *G06F 16/21* | (2019.01) |
| *G06F 16/25* | (2019.01) |
| *G06F 16/27* | (2019.01) |
| *G06N 20/00* | (2019.01) |

(52) U.S. Cl.
CPC .......... *G06F 16/2282* (2019.01); *G06F 16/21* (2019.01); *G06F 16/252* (2019.01); *G06F 16/27* (2019.01); *G06N 20/00* (2019.01)

(58) Field of Classification Search
CPC ...... G06F 16/2282; G06F 16/21; G06F 16/27; G06F 16/252; G06N 20/00
See application file for complete search history.

(56) References Cited

U.S. PATENT DOCUMENTS

| | | | | |
|---|---|---|---|---|
| 10,360,214 | B2 * | 7/2019 | Gold | G06T 1/60 |
| 10,713,587 | B2 * | 7/2020 | Rozier | G06Q 10/10 |
| 10,740,358 | B2 * | 8/2020 | Chan | G06F 16/9535 |
| 11,188,390 | B2 | 11/2021 | Brebner | |
| 11,651,007 | B2 * | 5/2023 | Shang | H04L 65/612 |
| | | | | 707/705 |
| 11,704,490 | B2 * | 7/2023 | Sriharsha | G06F 16/3347 |
| | | | | 704/9 |
| 2018/0067987 | A1 * | 3/2018 | Kang | G06F 16/2443 |
| 2019/0306093 | A1 * | 10/2019 | Schilling | G06F 16/2455 |
| 2020/0118039 | A1 * | 4/2020 | Kocberber | G06F 1/266 |
| 2020/0380000 | A1 * | 12/2020 | Busjaeger | G06F 16/24552 |
| 2021/0174383 | A1 | 6/2021 | Mckinlay et al. | |
| 2021/0200749 | A1 | 7/2021 | Sghiouer | |

(Continued)

FOREIGN PATENT DOCUMENTS

| | | | | | |
|---|---|---|---|---|---|
| CN | 110493043 | A | * 11/2019 | | G06F 16/27 |
| CN | 110851425 | A | * 2/2020 | | G06F 16/214 |

(Continued)

*Primary Examiner* — Neveen Abel Jalil
*Assistant Examiner* — Hubert Cheung
(74) *Attorney, Agent, or Firm* — Marks & Clerk; Paul Horbal; Maria Wei

(57) ABSTRACT

Systems and methods for preprocessing large inference files in a cluster environment prior to transmission to one or more downstream applications. The inference files are processed using templates that correspond to particular downstream applications, allowing for optimized transmission and optimized processing by each downstream application.

20 Claims, 6 Drawing Sheets

(56) References Cited

U.S. PATENT DOCUMENTS

| | | | |
|---|---|---|---|
| 2021/0216564 A1* | 7/2021 | Noll | G06F 16/2365 |
| 2021/0256000 A1 | 8/2021 | Niederhausern et al. | |
| 2021/0374143 A1 | 12/2021 | Neill | |
| 2021/0390507 A1* | 12/2021 | Reynolds | G06F 16/212 |
| 2022/0036002 A1* | 2/2022 | Sriharsha | G06N 3/08 |
| 2022/0100757 A1* | 3/2022 | Hong | G06F 16/244 |
| 2022/0179844 A1* | 6/2022 | Banerjee | G06F 16/252 |
| 2023/0023181 A1* | 1/2023 | Shang | G06F 16/248 |
| 2023/0066765 A1* | 3/2023 | Thomas | G08B 3/10 |
| 2023/0259521 A1* | 8/2023 | Haelen | G06F 16/254 |
| | | | 707/602 |
| 2023/0368048 A1* | 11/2023 | Yang | G06N 20/00 |
| 2024/0233560 A1* | 7/2024 | Baldwin | G08G 5/53 |

FOREIGN PATENT DOCUMENTS

| | | | | | |
|---|---|---|---|---|---|
| CN | 113127450 A | * | 7/2021 | | |
| CN | 113468255 A | * | 10/2021 | | G06F 18/251 |
| CN | 114741375 A | * | 7/2022 | | |

* cited by examiner

400

RECEIVE DATA — 405

STORE — 410

PROCESS — 415

PROVIDE OUTPUT — 420

GENERATE AND TRANSMIT NOTIFICATIONS — 425

SYSTEMS AND METHODS FOR OPTIMIZING DATA PROCESSING IN A DISTRIBUTED COMPUTING ENVIRONMENT

TECHNICAL FIELD

The disclosed exemplary embodiments relate to computer-implemented systems and methods for processing data and, in particular, to systems and methods for processing data in multiple stages within a distributed computing environment.

BACKGROUND

Many distributed or cloud-based computing clusters provide parallelized, fault-tolerant distributed computing and analytical protocols (e.g., the Apache Spark™ distributed, cluster-computing framework, the Databricks™ analytical platform, etc.) that facilitate adaptive training of machine learning or artificial intelligence processes, and real-time application of the adaptively trained machine learning processes or artificial intelligence processes to input datasets or input feature vectors. These processes can involve large numbers of massively parallelizable vector-matrix operations, and the distributed or cloud-based computing clusters often include graphics processing units (GPUs) capable of processing thousands of operations (e.g., vector operations) in a single clock cycle and/or tensor processing units (TPUs) capable of processing hundreds of thousands of operations (e.g., matrix operations) in a single clock cycle. Use of such distributed or cloud-based computing clusters can therefore accelerate the training and subsequent deployment of the machine-learning and artificial-intelligence processes, and may result in a higher throughput during training and subsequent deployment, when compared to the training and subsequent deployment of the machine-learning and artificial-intelligence processes across the existing computing systems of a particular organization.

SUMMARY

The following summary is intended to introduce the reader to various aspects of the detailed description, but not to define or delimit any invention.

In at least one broad aspect, there is provided a system for optimized data processing in a networked computing environment, the system comprising: an application database storing a first table and at least one additional table, the first table having inference data generated by a machine learning model, the inference data having fields and records in tabular form; a downstream computer executing a downstream application; and a computing cluster operatively coupled to the application database, the computing cluster comprising a plurality of nodes, at least one node having a memory and a processor configured to: retrieve the first table and the at least one additional table from the application database; process the first table and the at least one additional table based on a template corresponding to the downstream application to generate an output table corresponding to the downstream application; and provide the output table to the downstream application; and wherein the downstream application is configured to generate a notification from the output table.

In some cases, the plurality of nodes divides the processing the first table and the at least one additional table using a MapReduce algorithm.

In some cases, the processing is a join operation.

In some cases, the processing the first table and the at least one additional table comprises synthesizing a data field using data from the first table and the at least one additional table.

In some cases, the at least one additional table comprises a second table storing second inference data generated by a second machine learning model.

In some cases, the at least one additional table comprises an auxiliary data table that stores deterministic data.

In some cases, the deterministic data comprises metadata regarding one or more users.

In some cases, the processing the first table and the at least one additional table comprises generating a unique identifier for each record of the output table.

In some cases, the downstream application is configured to: generate the notification based on a record of the output table; and transmit the notification to a user device corresponding to the record.

In another broad aspect, there is provided a method of optimizing data processing in a networked computing environment, the method comprising: receiving inference data generated by a machine learning model, the inference data having fields and records in tabular form; storing the inference data in a first table of a database, the database storing at least one additional table; processing the first table and the at least one additional table based on a template corresponding to a downstream application, to generate an output table corresponding to the downstream application; and providing the output table to the downstream application to generate notifications from the output table.

In some cases, the processing is performed in a mapping module executed by a plurality of nodes in a computing cluster.

In some cases, the plurality of nodes divides the processing using a MapReduce algorithm.

In some cases, the processing is a join operation.

In some cases, the processing comprises synthesizing a data field using data from the first table and the at least one additional table.

In some cases, the at least one additional table comprises a second table storing second inference data generated by a second machine learning model.

In some cases, the at least one additional table comprises an auxiliary data table that stores deterministic data.

In some cases, the deterministic data comprises metadata regarding one or more users.

In some cases, the processing comprises generating a unique identifier for each record of the output table.

In some cases, the method further comprises the downstream application: receiving the output table; generating a notification corresponding to a record in the output table; and transmitting the notification to a user device corresponding to the record.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1A:
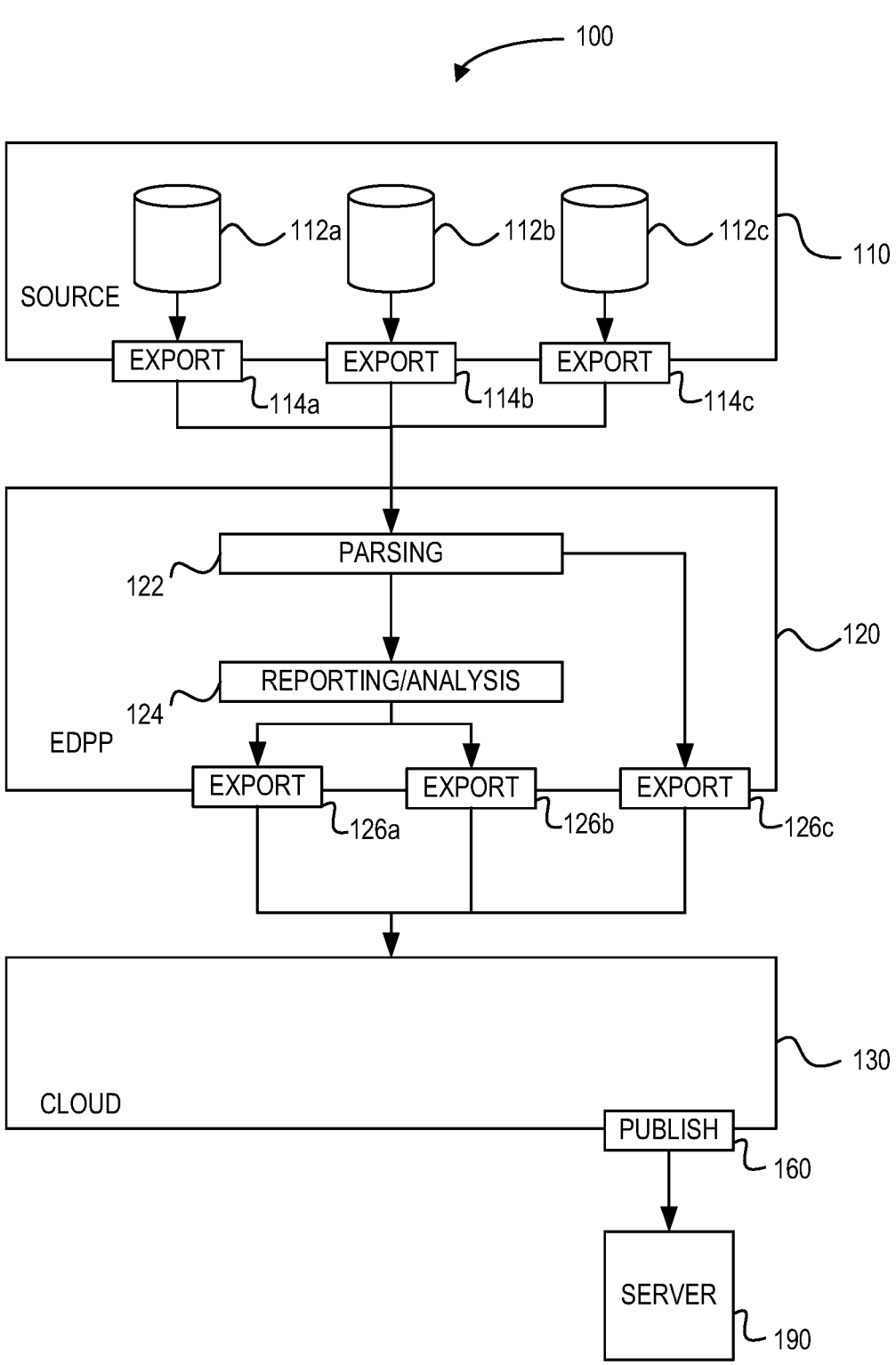
FIG. 1A is a schematic block diagram of a system for optimized multi-stage processing in accordance with at least some embodiments.

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers. This quantity and scope of confidential data represents a highly desirable source of data to be used as input into machine learning models that can be trained, e.g., to predict future occurrences of events, such as customer interactions or non-interactions.

With such large volumes of data, it may be desirable to use the computational resources available in distributed or cloud-based computing systems. For instance, machine learning models may be used to generate predictions or inferences regarding these sets of data. In some cases, models may be trained to predict a likelihood of an event occurring in the future, given certain existing information relevant to the prospective event. For instance, one model may be trained to predict the likelihood of a person taking a specific action, given historical or biographical knowledge of the person. Often, the models will have a large volume of data to consider, both about the individuals, and also because there may be large numbers of individuals in the data for which to generate predictions, resulting in large output inference data. If further processing of the inference data is performed, particularly by further machine learning models, the computational effort required may be compounded.

The described embodiments generally provide for an intermediate processing step to merge and transform tables according to a template corresponding to each downstream application that will ingest data. The intermediate processing can be performed using a computing cluster optimized for such processing, freeing the downstream application to use its resources more efficiently.

According to at least some embodiments, when inference data is generated, further processing or prediction may take place. However, it may be inefficient for downstream applications to process all of the prediction data generated by the initial models. In particular, the models may produce large volumes of tabular data, for instance in comma-separated value (CSV) files. Moreover, each model may have its own output format, which may need to be merged and/or transformed prior to downstream processing. One option is for downstream processing to perform such data merging and transforming, however it may be inefficient to transfer the large volumes of data and difficult to perform join operations without prior knowledge of the output formats of each model. This is particularly inefficient when there are multiple downstream applications, each with different input requirements.

In at least some embodiments, the described systems and methods provide for processing prediction data output by one or more machine learning models to facilitate further processing by one or more downstream applications, including, e.g., a downstream application that transmits notifications to a plurality of user devices.

Referring now to FIG. 1A, there is illustrated a block diagram of an example computing system, in accordance with at least some embodiments. Computing system 100 has a source database system 110, an enterprise data provisioning platform (EDPP) 120 operatively coupled to the source database system 110, and a cloud-based computing cluster 130 that is operatively coupled to the EDPP 120.

Source database system 110 has one or more databases, of which three are shown for illustrative purposes: database 112a, database 112b and database 112c. Each of the databases of source database system 110 may contain confidential information that is subject to restrictions on export. One or more export modules 114 may periodically (e.g., daily, weekly, monthly, etc.) export data from the databases 112 to EDP 120. In some cases, the export data may be exported in the form of comma separated value (CSV) data, however other formats may also be used.

EDPP 120, which may also be referred to as a publishing server, receives source data exported by the export modules 114 of source database system 110, processes it and exports the processed data to an application database within the cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to an application or group of applications (e.g., a client application) may be exported via reporting and analysis module 124 or an export module 126. In particular, parsed data can then be processed and transmitted to the cloud-based computing cluster 130 by a reporting and analysis module 124. Alternatively, one or more export modules 126 can export the parsed data to the cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of PII in the confidential data. Moreover, such "on-premises" systems typically are designed with access controls to limit access to the data, and thus may not be resourced or otherwise suitable for use in broader dissemination of the data. To comply with such restrictions, one or more module of EDPP 120 may "de-risk" data tables that contain confidential data prior to transmission to cluster 130. This de-risking process may, for example, obfuscate or mask elements of confidential data, or may exclude certain elements, depending on the specific restrictions applicable to the confidential data. The specific type of obfuscation, masking or other processing is referred to as a "data treatment."

Figure 1B:
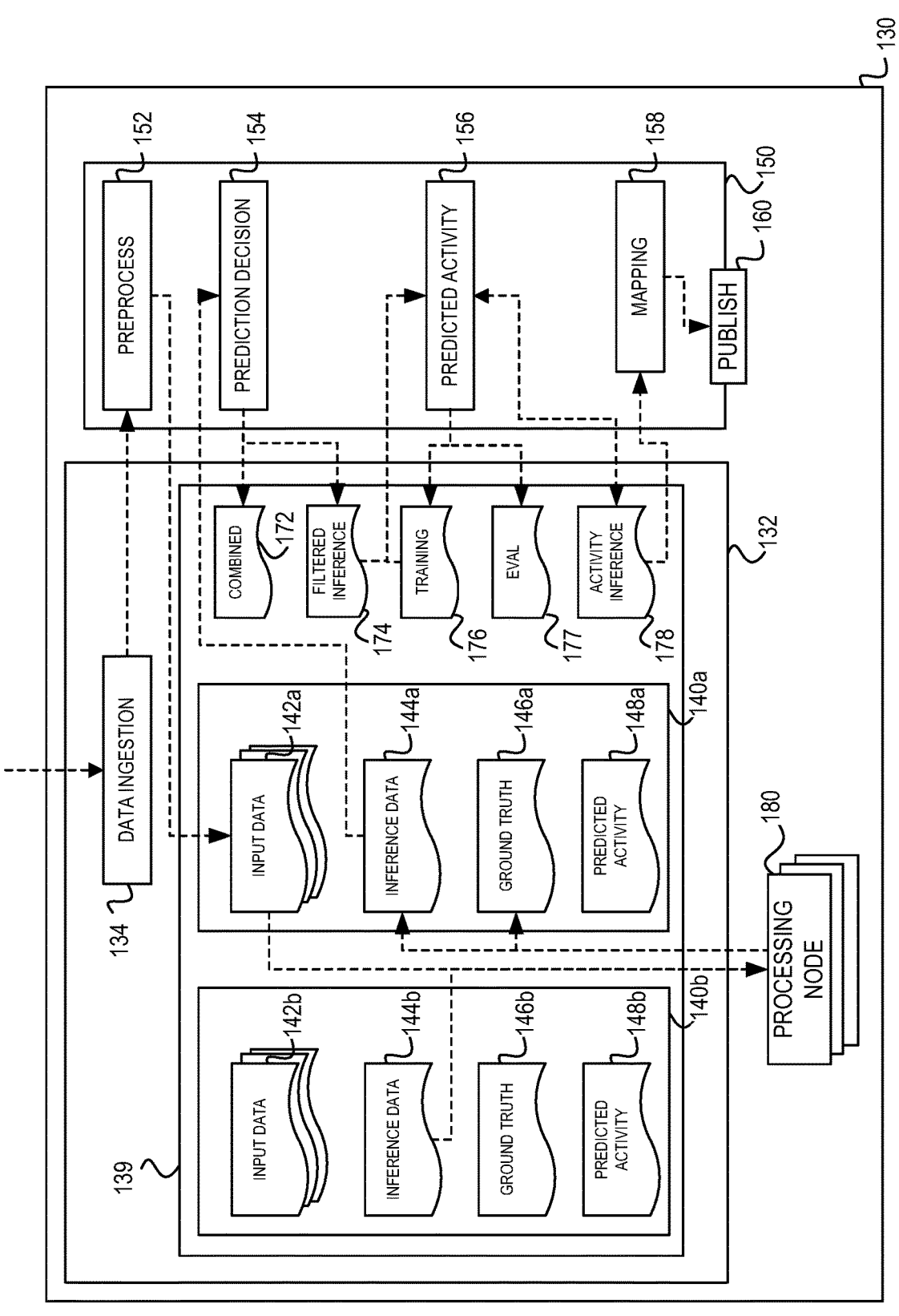
FIG. 1B is a schematic block diagram of a computing cluster of FIG. 1A in accordance with at least some embodiments.

Referring now to FIG. 1B, there is illustrated a block diagram of computing cluster 130, showing greater detail of the elements of the cluster, which may be implemented by computing nodes of the cluster that are operatively coupled.

Within cluster 130, both data received from reporting and analysis module 124 and data received from export modules 126 is ingested by a data ingestion module 134. Ingested data may be stored, e.g., in a distributed file system 132 such as the Hadoop Distributed File System (HDFS). HDFS can be used to implement one or more application database 139, each of which may contain one or more tables, and which may be partitioned temporally or otherwise.

For ease of illustration, only one application database 139 is shown, with two temporal partitions 140a and 140b depicted. However, additional application databases may be provided. Generally, the application database stores data, such as inference data from a machine learning model, the inference data having fields and records in tabular form.

Partition 140a is a current partition, corresponding to a current operation. Partition 140b is a partition corresponding to a previous run. Additional previous partitions may also be present. Each partition corresponds to a run of application data processing, such as an execution of a machine learning model. Data for and from each previous run may be stored in its own partition.

Each partition of application database 139 has one or more input data tables 142, and one or more inference data tables for storing inference data generated by execution of a machine learning model. Generally, a machine learning model can be executed by a node (or nodes) that has access to the application database. During execution, the node may retrieve information from the application database, perform processing to generate an output inference file, and store the output inference data in the appropriate table of the application database.

In the illustrated example embodiment, the inference data tables include an inference data table 144, a ground truth table 146, and a predicted activity table 148.

Input data table 142 contains input data that may be received directly from data ingestion module 134, or from preprocessing module 152 following preprocessing. Inference data table 144 stores inference data output by a processing node 180 following execution of a first machine learning model. Similarly, ground truth table 146 stores ground truth data output by the processing node 180 following execution of the first machine learning model. However, predicted activity table 148 stores inference data output by a processing node 150 following execution of an activity prediction machine learning model.

Application database 139 also includes one or more tables that may exist outside of temporal partitions in the distributed file system. In some cases, these tables may be implemented in Apache Hive™.

In some cases, processing node 150 may have a preprocessing module 152 for conditioning data from ingestion module 134. For example, in many cases, it may be desirable for input to a machine learning model to be preprocessed or otherwise conditioned prior to ingestion to the model.

Generally, the preprocessing module preprocesses input data in tabular form to generate preprocessed data. The preprocessing module 152 may perform several functions. It may preprocess data to, e.g., perform input validation, data normalization and filtering to remove unneeded data. For instance, data normalization may include converting alphabetic characters to all uppercase, formatting numerical values, trimming data, etc. In some cases, preprocessing module 152 may apply data treatments. Following preprocessing, the output of preprocessing module 152 may be stored in input data table 142, in the current partition of application database 139. In some cases, the output of preprocessing module 152 may also be stored in a Hive™ table (not shown).

In some cases, processing node 150 may have a prediction decision module 154 that retrieves or receives input data from inference data table 144 of the application database, processes the inference data to identify records that meet one or more predetermined threshold, and generates filtered inference data. For instance, for a first predetermined threshold, processing node 150 processes the inference data to identify records that meet the first predetermined threshold and adds a first threshold column to the filtered inference data, where for each record the field corresponding to the record row and first threshold column serves as an indication of whether the respective record meets the first predetermined threshold. Similarly, for a second predetermined threshold, processing node 150 processes the inference data to identify records that meet the second predetermined threshold and adds a second threshold column to the filtered inference data, where for each record the field corresponding to the record row and second threshold column serves as an indication of whether the respective record meets the second predetermined threshold. This process may be repeated for as many thresholds as are desired.

In some cases, the processing for a second or subsequent predetermined threshold may be optimized by processing only those records that meet a prior predetermined threshold.

Once the processing is completed, the filtered inference data can then be stored together with the original inference data in a single table 172. Alternatively, only those records that satisfy the one or more predetermined threshold may be stored in a filtered table 174.

In general, prediction decision module 154 may retrieve inference files generated by a machine learning model and perform analysis to determine whether individual records in the inference files meet one or more threshold requirements. The inference files may be in tabular form, with rows of data representing individual records, and columns that correspond to fields.

The thresholding process may add one or more additional column to the inference data table to contain an indication of whether each record has met a particular threshold and thereby produce filtered inference data. If there is one threshold, then only one column may be added. If there is more than one threshold to be evaluated (e.g., for different downstream purposes), then multiple columns may be added. The value for each record in the threshold column may be binary to indicate whether the threshold of that column has been met. In some cases, a numerical score may be provided instead.

Various thresholds can be set. For example, a threshold may be an indication of whether each record belongs to a predetermined percentile of a desired metric, that is, whether a record falls within a certain percentile of all records under consideration for some metric, such as a numerical value. In one example, the desired metric may be a credit risk of a user, where each record corresponds to a single user. In such an example, the threshold may be set at the $95^{th}$ percentile, with the result that records of users who present a credit risk that is in the top 5% of all users will be flagged. The threshold can, of course, be set at different levels. As previously noted, multiple thresholds may also be set (e.g., $50^{th}$ percentile, $95^{th}$ percentile, $99^{th}$ percentile, etc.)

The thresholding process may involve employing a machine learning model configured to determine the category into which each record falls, or it may involve conventional processing.

As with the inference data, the filtered inference data generally has fields and records in tabular form. The filtered inference data also has an additional column corresponding to each predetermined threshold, which is used to indicate whether each record (corresponding to a row) meets the respective threshold. Table 1 illustrates an example filtered inference data table.

TABLE 1

| Example filtered inference data | | | | |
|---|---|---|---|---|
| | | | Added Columns | |
| Original Inference Data | | | Threshold 1 | Threshold 2 |
| ID | Length | Weight | (length >500) | (weight >100) |
| 0001 | 900 | 50 | Yes | No |
| 0002 | 400 | 110 | No | Yes |
| 0003 | 800 | 105 | Yes | Yes |

In the example of Table 1, a first predetermined threshold is a length of greater than 500 units. Records 0001 and 0003 meet this threshold, therefore the "Threshold 1" column contains an indication of "Yes" for the rows corresponding to records 0001 and 0003. The row corresponding to record 0002 contains an indication of "No" in the "Threshold 1" column.

Similarly, a second predetermined threshold is a weight of greater than 100 units. Records 0002 and 0003 meet this threshold, therefore the "Threshold 2" column contains an indication of "Yes" for the rows corresponding to records 0002 and 0003. The row corresponding to record 0001 contains an indication of "No" in the "Threshold 2" column.

Although "Yes" and "No" indications are shown, any kind of suitable indication may be used, including numerical indications. In some cases, a numerical value within a range may be used to indicate a degree to which a given threshold is met.

Furthermore, the example above depicts a simple threshold based on a single numerical value. However, the predetermined threshold may be based on a combination of factors, on percentiles, or may be based on meeting a threshold determined by application of a machine learning model.

Once the thresholding process of prediction decision module 154 is complete, filtered inference data is stored in the application database.

Subsequently, further processing of the filtered inference data can be performed by other machine learning models or conventional processes. For example, a first process may take the filtered inference data, identify the records that have met a first predetermined threshold, and perform processing on only those records that have met the first predetermined threshold to generate first application data. A second process may take the filtered inference data, identify the records that have met a second predetermined threshold, and perform processing on only those records that have met the second predetermined threshold to generate second application data, and so forth.

In the illustrated example embodiments, processing node 150 has a predicted activity module 156 that receives input data from filtered inference data table 174, and processes the filtered inference data to generate predictions regarding activity, such as user activity. The further processing may therefore involve a prediction of an upcoming event or activity, that can generate recommendations for users who fall within a particular threshold.

For example, in one example embodiment, the filtered inference data table contains user records that include information such as account balance information, recent account activity, and so forth. The predicted activity module 156 may apply a machine learning model to identify users who are at risk of default for a credit facility. In this case, the filtered inference data would have been filtered by prediction decision module 154 using a threshold that identified users, e.g., in the bottom $5^{th}$ percentile of account balances, to screen out the remaining 95% of users and thereby reduce the processing load on the predicted activity module 156.

The predicted activity module 156 outputs its prediction data to activity inference data table 178. Optionally, predicted activity module 156 also may output training and evaluation data to tables 176 and 177, where it can be used to improve the performance of the predicted activity module 156.

The predicted activity module 156 may generate large output tables, which can contain millions of records. These tables are typically exported in comma-separated value (CSV) format, which can be hundreds of megabytes in size. In some cases, the output tables may contain data that can be used by multiple downstream applications, though each downstream application may only use a different subset of the data.

Some downstream applications (CTS) may not be able to process data in CSV format, or else it may be inefficient to transmit large CSV files containing millions of records. In some cases, the downstream application may require additional data from other tables (e.g., ground truth data, biographic data from a database, other inferences, etc.). In such cases, transferring multiple CSV files would be inefficient and may not be possible for security reasons. Moreover, the downstream application may require data that is not contained in the model output, and it may be inefficient to modify the models to contain this data in the model output.

In some cases, downstream applications may expect to receive input in Javascript Object Notation (JSON) or Extensible Markup Language (XML) or other format. Accordingly, a mapping module 158 executes to ingest a first table and at least one additional table, which may be in the form of one or more CSV files, preprocess the data, and output a file (e.g., a JSON file) formatted according to the requirements of the downstream application. The downstream application may specify its requirements in a template, which is used by the mapping module 158 to process the records for the downstream application. The preprocessing may involve, e.g., performing join operations to join tables, synthesizing a data field using data from the first table and the at least one additional table, and other data transforms. The at least one additional table may contain inference data generated by one or more other machine learning models, and/or auxiliary data that is deterministic data. Deterministic data is data that is known about an item or individual, and is not synthesized using non-deterministic methods such as machine learning. Examples of deterministic data include, but are not limited to, metadata, biographical information, address information, objective facts, etc.

In one example, a downstream application may be configured to generate and transmit notifications to a plurality of user devices, e.g., regarding the output of the predicted activity module 156. Each individual predicted event may be referred to as a nudge. There may be more than one nudge per user generated in each run of the mapping module 158, accordingly the mapping module 158 may add priorities to nudges, such that the number of nudges sent within a predetermined period does not exceed a preset threshold (e.g., no more than one nudge per day to any given user).

In some cases, the mapping module 158 may also generate additional fields, such as a unique identifier, or data retrieved from other sources, or synthesized according to the requirements for the downstream application (e.g., custom content according to the type of nudge).

In one example embodiment, the mapping module 158 may be implemented in the PySpark framework, which enables processing by a cluster of nodes. Data is cached in memory and divided among nodes using a MapReduce algorithm. Writing of output is deferred until all processing is complete to avoid bottlenecks. Accordingly, a typical example run allows for several million records to be processed in approximately 10 minutes.

The mapping module 158 may also be configured with a plurality of pipelines, corresponding to different downstream applications with different templates and requirements, which can execute concurrently.

In some cases, the mapping module 158 may be adapted to generate output in circumstances where some inputs are not available. For instance, if the predicted activity module 156 did not produce an output for the desired period, the mapping module 158 may nevertheless produce an output using inference data, and vice versa.

The output of the mapping module 158 is sent to one or more respective downstream applications, which can then act on the output to, e.g., distribute notifications corresponding to each nudge to the appropriate user devices.

Although processing node 150 is shown as one node, in practice its functions may be implemented by several nodes distributed throughout the cluster 130. Similarly, processing node 180 may be implemented by several nodes distributed throughout the cluster 130.

In some embodiments, one or more downstream application server 190 may be operatively coupled to cluster 130 and to application database 139. The downstream application server may be a remote server, for example, that is configured to retrieve a subset of the filtered inference data from the application database (e.g., as provided by the mapping module 158) and process the subset of the filtered inference data to generate application data, wherein the subset is determined based on the threshold column.

In some cases, the downstream application server may implement an additional machine learning model, in which case the processing involves providing the subset of the filtered inference data as input to the additional machine learning model, and an output of the additional machine learning model is the application data that is generated.

In some cases, the downstream application server may further generate notifications based on the application data, and transmit those notifications to one or more user devices.

Figure 2:
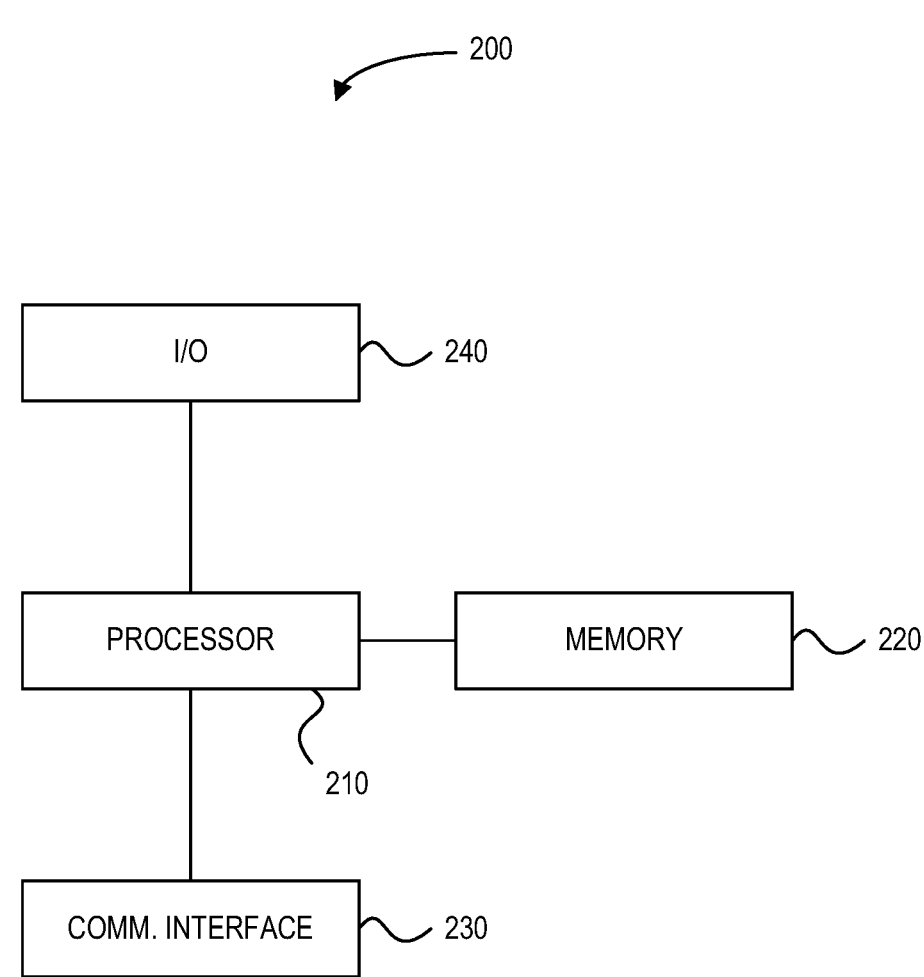
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as source database system 110, EDPP 120, processing node 150 or 180 of FIG. 1. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some implementations, computer 200 may be batch processing system that is generally designed and optimized to run a large volume of operations at once, and are typically used to perform high-volume, repetitive tasks that do not require real-time interactive input or output. Source database system 110 may be one such example. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks. Processing nodes 150 and 180 are examples of interactive systems, which are nodes in a distributed or cloud-based computing system.

Figure 3A:
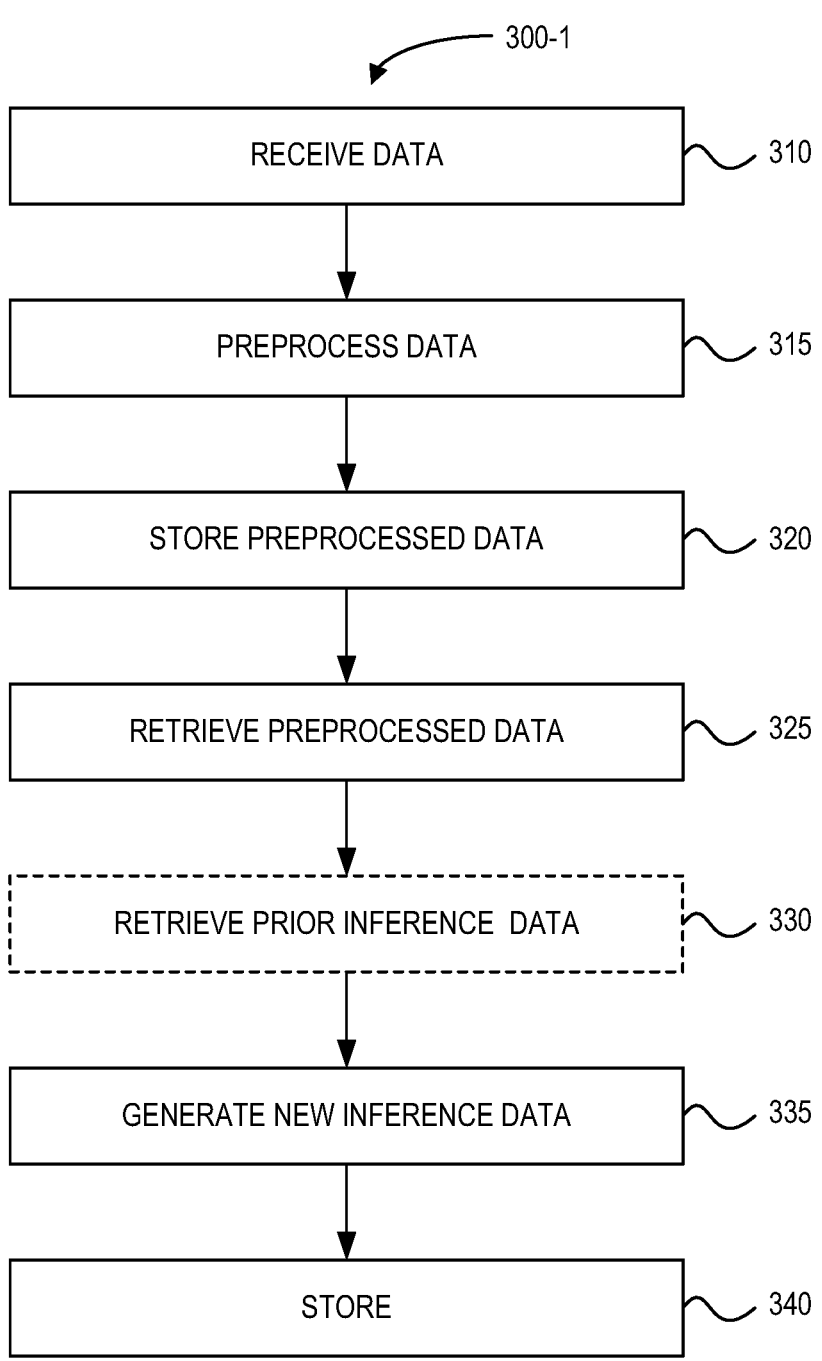
FIG. 3A is a flowchart diagram of an example method of preprocessing data and executing a machine learning model.

Referring now to FIG. 3A, there is illustrated a flowchart diagram of an example method of preprocessing data and executing a machine learning model in accordance with at least some embodiments. Method 300-1 may be carried out, e.g., by system 100 of FIG. 1.

Method 300-1 begins at 310 with a processor, such as a processor of processing node 150, receiving data from distributed file system 132 and/or data ingestion module 134.

At 315, preprocessing module 152 is executed by the processor to take input data from the distributed file system, e.g., in tabular form, and generate preprocessed data. As described elsewhere herein, the preprocessing module preprocesses input data in tabular form to generate preprocessed data. The preprocessing may involve, e.g., input validation, data normalization and filtering to remove unneeded data. For instance, data normalization may include converting alphabetic characters to all uppercase, formatting numerical values, trimming data, etc. In some cases, preprocessing module 152 may apply data treatments.

At 320, following preprocessing, the preprocessed data may be stored in an application database of the distributed file system. For example, the preprocessed data may be stored in an input data table 142a, in the current partition of application database 139.

At 325, a machine learning node, such as processing node 180, retrieves the preprocessed data from the input data table 142a. Optionally, depending on the machine learning model, the processing node 180 may retrieve additional data at 330, such as inference data from a prior run of the machine learning model (e.g., from inference data table 144b).

At 335, the processing node executes a machine learning model on the retrieved data to generate inference data and, at 340, the output inference data is stored in the appropriate table or tables of the application database, such as inference data table 144a or ground truth table 146a.

Figure 3B:
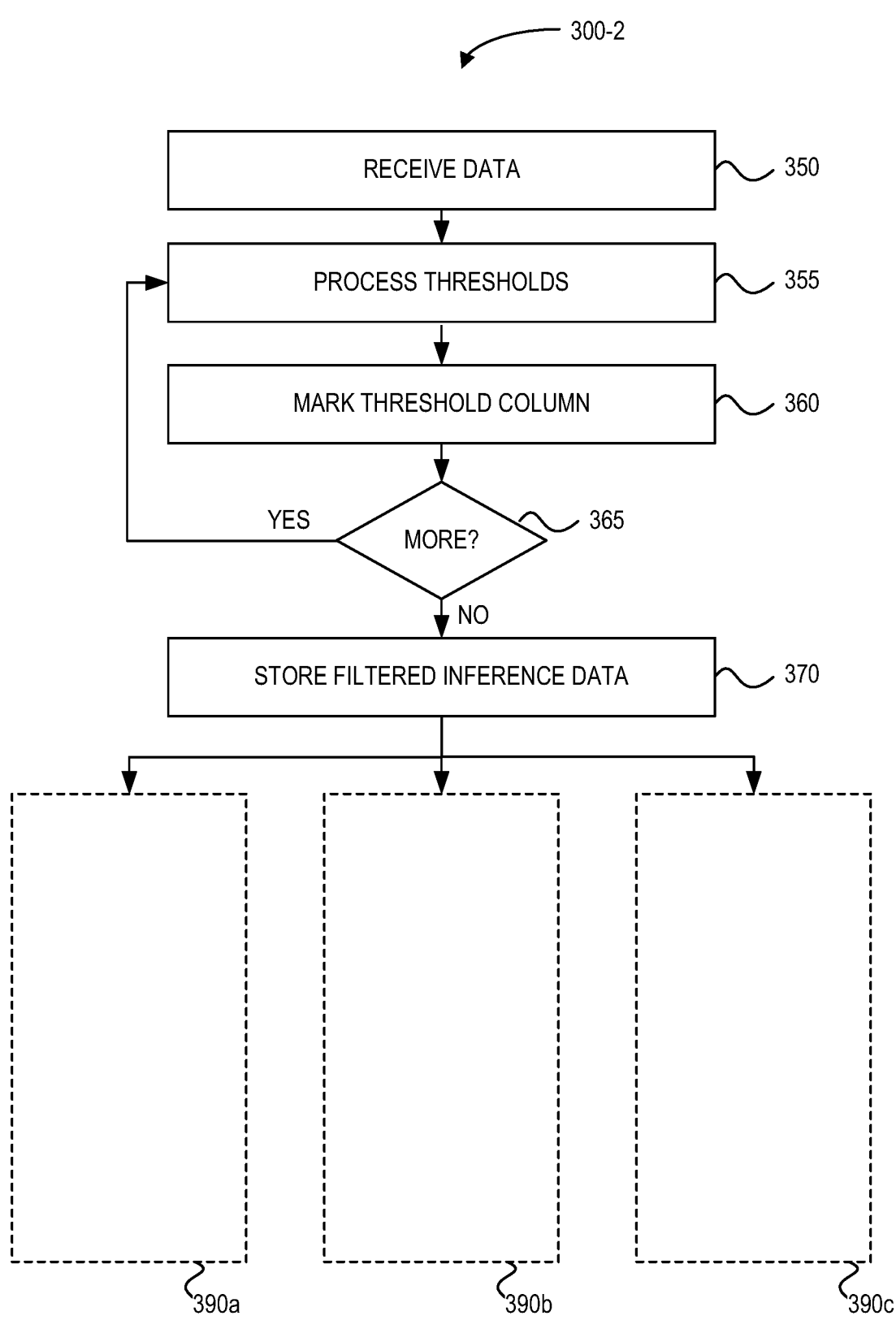
FIG. 3B is a flowchart diagram of an example method of optimized multi-stage processing.

Referring now to FIG. 3B, there is illustrated a flowchart diagram of an optional method of optimizing multi-stage data processing in accordance with at least some embodiments. Method 300-2 may be carried out, e.g., by system 100 of FIG. 1. In at least some cases, method 300-2 continues from 335 or 340 of method 300-1.

Method 300-2 begins at 350 with a processor, such as a processor of processing node 180, executing a prediction decision module 154 to receive inference data from an inference data table, such as inference data table 144*a* of application database 139 of distributed file system 132. As described elsewhere herein, execution of prediction decision module 154 may cause the processor to retrieve inference files generated by a machine learning model and perform analysis to determine whether individual records in the inference files meet one or more threshold requirements. The inference files may be in tabular form, with rows of data representing individual records, and columns that corresponding to fields.

At 355, the processor processes the inference data to identify records that meet a first predetermined threshold. As described elsewhere herein, the predetermined threshold can be determined based on a percentile placement of each of the records in the inference data, including based on the numerical data.

At 360, the processor adds a column to the tabular data and, for each record, adds an indication representing whether the first predetermined threshold is met, creating filtered inference data. For instance, for a first predetermined threshold, processing node 150 processes the inference data to identify records that meet the first predetermined threshold and adds a first threshold column to the filtered inference data, where for each record the field corresponding to the record row and first threshold column serves as an indication of whether the respective record meets the first predetermined threshold.

At 365, the processor determines whether there are additional predetermined thresholds to be evaluated. If there are, the processor returns to 355 to process the second or subsequent predetermined threshold. This process may be repeated for as many thresholds as are desired.

If there are no more thresholds to evaluate, then at 370, the processor stores the filtered inference data in one or more tables of an application database, such as table 172 or filtered table 174, described elsewhere herein.

Optionally, at 390, the processor may further process inference data for one or more downstream applications, for example using the mapping module 158.

Figure 4:
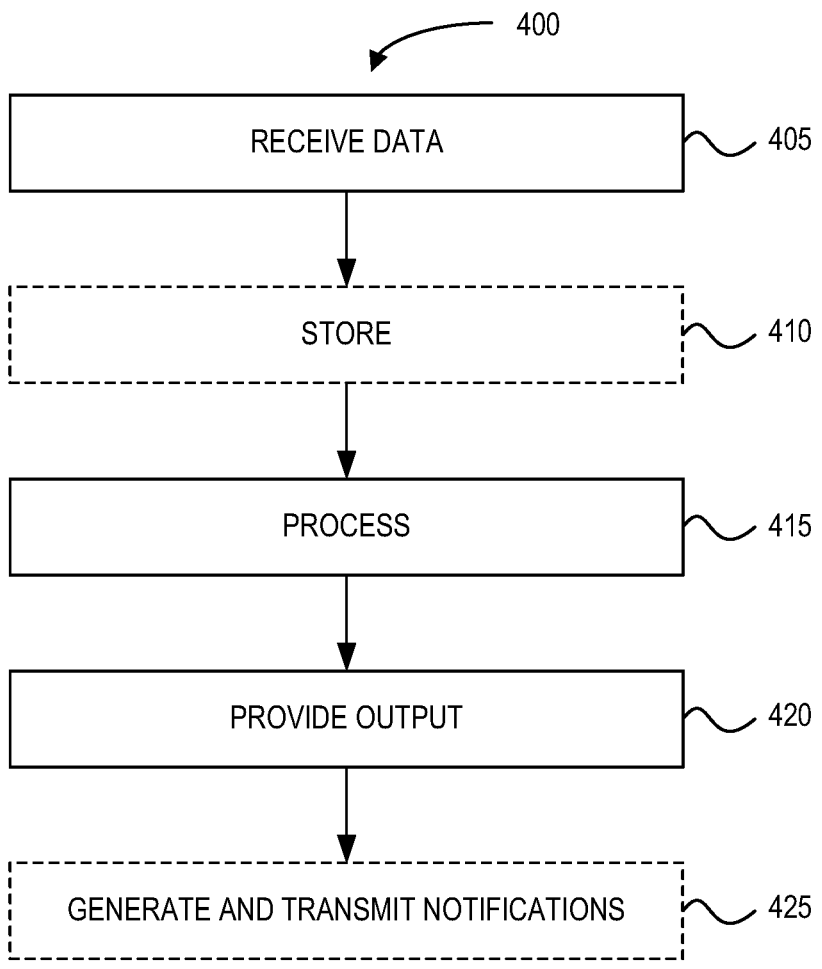
FIG. 4 is a flowchart diagram of an example method of optimizing data processing in a distributed computing environment in accordance with at least some embodiments.

Referring now to FIG. 4, there is illustrated a flowchart diagram of a method of optimizing processing for one or more downstream applications in accordance with at least some embodiments. Method 400 may be carried out, e.g., by system 100 of FIG. 1 and, in particular by mapping module 158 and server 190. In at least some cases, method 400 may continue from 335 or 340 of method 300-1, or 370 or 390 of method 300-2.

Method 400 begins at 405 with a processor, such as a processor of processing node 150, executing a mapping module 158 to receive inference data originally generated by a machine learning model. The inference data may be in tabular form. In some cases, the inference data may have been generated, e.g., at 335 of method 300-1, or at 370 of method 300-2.

Optionally, if the inference data has not been stored in the application database, then at 410, the inference data is stored in a first table of the application database. The application database may contain at least one additional table storing, e.g., other inference data from a different model or a previous run of the same model, or deterministic data.

At 415, the processor executes a mapping module to process the first table and the at least one additional table based on a template corresponding to a downstream application. The processing may include, e.g., join operations, synthesizing data fields using data from the first table and the at least one additional table, joining data produced by another machine learning model, joining data from an auxiliary data table that stores deterministic data, and/or joining metadata regarding one or more users. The processing generates an output table corresponding to the downstream application. Each record of the output table may have a unique identifier generated for each record in the output table.

At 420, the output table may be provided to the corresponding downstream application, which may act on the data in the output table to, e.g., generate and transmit notifications to user devices at 425. In some cases, rather than providing the entire output table to the downstream application, the processor may generate and transmit individual items of data corresponding to individual user devices, e.g., that are to receive a notification.

There may be a plurality of downstream applications that perform unique processing of the inference data, based on different subsets or combinations of subsets of filtered inference data determined based on the threshold columns. Accordingly, method 400 may be executed concurrently by a plurality of mapping modules or processors, to concurrently produce output tables corresponding to a plurality of downstream applications, each based on respective templates.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112a, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touch-screen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs)

capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

We claim:
1. A system for optimized data processing in a networked computing environment, the system comprising:
an application database storing a plurality of flat files of a distributed file system, a first flat file comprising a first inference table and at least one additional flat file comprising at least one additional table, the first inference table having fields and user records in a first format having a tabular form, at least one field of the first inference table comprising inference data indicative of a category for each user record, the category being determined based on one or more input data corresponding to the user record, the at least one additional table being in a second format;
a downstream computer executing a downstream application;

at least one additional downstream computer executing a respective downstream application; and a computing cluster operatively coupled to the application database, the computing cluster comprising a plurality of nodes, at least one node having a memory and a processor configured to:

provide output data, wherein the output data comprises inference data generated by execution of a machine learning model and auxiliary data generated from deterministic methods;

in response to determining that the output data comprises inference data and auxiliary data, store the inference data in the first inference table and the auxiliary data in the at least one additional table;

retrieve the first inference table and the at least one additional table from the application database;

in a first pipeline, merge and transform a first subset of the first inference table and the at least one additional table based on a template corresponding to the downstream application, to generate an output table customized for the downstream application, the output table comprising at least one new data field generated by combining data from the first subset of the first inference table and the at least one additional table;

for each additional downstream application, in an additional pipeline executed concurrently with the first pipeline, merge and transform an additional subset of the first inference table and the at least one additional table based on an additional template corresponding to the respective downstream application, to generate an additional output table customized for the respective downstream application, the additional output table comprising at least another new data field generated by combining data from the additional subset of the first inference table and the at least one additional table; and provide the output table to the downstream application and each additional output table to the respective downstream application; and wherein the downstream application is configured to generate a notification from the output table.

2. The system of claim 1, wherein the plurality of nodes divides the processing of the first inference table and the at least one additional table using a MapReduce algorithm.

3. The system of claim 1, wherein the merging is a join operation.

4. The system of claim 1, wherein the plurality of flat files comprises a second flat file, the second flat file comprising a second inference table storing second inference data generated by a second machine learning model.

5. The system of claim 1, wherein the auxiliary data comprises metadata regarding one or more users.

6. The system of claim 1, wherein the merging and transforming of the first inference table and the at least one additional table to generate the output table comprises generating a unique identifier for each user record of the output table.

7. The system of claim 1, wherein the downstream application is configured to:

generate the notification based on a user record of the output table; and transmit the notification to a user device corresponding to the user record.

8. The system of claim 1, wherein the distributed file system comprises a Hadoop Distributed File System.

9. The system of claim 1, wherein the plurality of flat files comprise comma-separated value (CSV) files.

10. The system of claim 1, wherein the first subset and the additional subset of the first inference table are determined based on the at least one field comprising inference data indicative of a category for each user record.

11. The system of claim 1, wherein the merging and transforming of the first inference table and the at least one additional table to generate the output table comprises generating a notification priority level for each user record of the output table.

12. A method of optimizing data processing in a networked computing environment, the method comprising:

provide output data, wherein the output data comprises inference data generated by execution of a machine learning model and auxiliary data generated from deterministic methods;

in response to determining that the output data comprises inference data and auxiliary data, storing the inference data in a first inference table and the auxiliary data in at least one additional table, the first inference table having fields and user records in a first format having a tabular form, at least one field of the first inference table comprising inference data indicative of a category for each user record, the category being determined based on one or more input data corresponding to the user record, the at least one additional table being in a second format;

retrieving the first inference table and the at least one additional table from an application database;

in a first pipeline, merging and transforming a first subset of the first inference table and the at least one additional table based on a template corresponding to a downstream application, to generate an output table customized for the downstream application, the output table comprising at least one new data field generated by combining data from the first subset of the first inference table and the at least one additional table;

for each additional downstream application, in an additional pipeline executed concurrently with the first pipeline, merging and transforming an additional subset of the first inference table and the at least one additional table based on an additional template corresponding to a respective downstream application, to generate an additional output table customized for the respective downstream application, the output table comprising at least another new data field generated by combining data from the additional subset of the first inference table and the at least one additional table; and providing the output table to the downstream application to generate notifications from the output table, and each additional output table to the respective downstream application.

13. The method of claim 12, wherein the processing is performed in a mapping module executed by a plurality of nodes in a computing cluster.

14. The method of claim 13, wherein the plurality of nodes divides the processing using a MapReduce algorithm.

15. The method of claim 12, wherein the merging is a join operation.

16. The method of claim 12, wherein the plurality of flat files comprises a second flat file, the second flat file comprising a second inference table storing second inference data generated by a second machine learning model.

17. The method of claim 12, wherein the auxiliary data comprises metadata regarding one or more users.

18. The method of claim 12, wherein the merging and transforming of the first inference table and the at least one additional table to generate the output table comprises generating a unique identifier for each user record of the output table.

19. The method of claim 12, further comprising the downstream application:

receiving the output table;

generating a notification corresponding to a user record in the output table; and transmitting the notification to a user device corresponding to the user record.

20. A non-transitory computer readable medium storing computer executable instructions which, when executed by at least one computer processor of a computer system, cause the at least one computer processor to carry out a method of optimizing data processing in a networked computing environment, the method comprising:

provide output data, wherein the output data comprises inference data generated by execution of a machine learning model and auxiliary data generated from deterministic methods;

in response to determining that the output data comprises inference data and auxiliary data, storing the inference data in a first inference table and the auxiliary data in at least one additional table, the first inference table having fields and user records in a first format having a tabular form, at least one field of the first inference table comprising inference data indicative of a category for each user record, the category being determined based on one or more input data corresponding to the user record, the at least one additional table being in a second format;

retrieving the first inference table and the at least one additional table from an application database;

in a first pipeline, merging and transforming a first subset of the first inference table and the at least one additional table based on a template corresponding to a downstream application, to generate an output table customized for the downstream application, the output table comprising at least one new data field generated by combining data from the first subset of the first inference table and the at least one additional table;

for each additional downstream application, in an additional pipeline executed concurrently with the first pipeline, merging and transforming an additional subset of the first inference table and the at least one additional table based on an additional template corresponding to a respective downstream application, to generate an additional output table customized for the respective downstream application, the output table comprising at least another new data field generated by combining data from the additional subset of the first inference table and the at least one additional table; and providing the output table to the downstream application to generate notifications from the output table, and each additional output table to the respective downstream application.

* * * * *